US012687193B2

(12) United States Patent (10) Patent No.: US 12,687,193 B2
Lichter et al. (45) Date of Patent: Jul. 21, 2026

(54) LOCKING SYSTEM

(71) Applicant: David I. Lichter, Somerville, MA (US)

(72) Inventors: David I. Lichter, Somerville, MA
(US); Brian J Walt, King of Prussia,
PA (US)

( * ) Notice: Subject to any disclaimer, the term of this
patent is extended or adjusted under 35
U.S.C. 154(b) by 360 days.

(21) Appl. No.: 18/425,023

(22) Filed: Jan. 29, 2024

(65) Prior Publication Data

US 2024/0167500 A1 May 23, 2024

Related U.S. Application Data

(63) Continuation of application No. 18/228,035, filed on
Jul. 31, 2023, now Pat. No. 11,885,368.

(60) Provisional application No. 63/411,985, filed on Sep.
30, 2022.

(51) Int. Cl.
F16B 39/12 (2006.01)
(52) U.S. Cl.
CPC .................................... F16B 39/12 (2013.01)
(58) Field of Classification Search
CPC ...... F16B 37/04; F16B 37/041; F16B 37/044;
F16B 37/045; F16B 37/122; F16B 39/12
USPC .......................................... 411/172, 173, 178
See application file for complete search history.

(56) References Cited

U.S. PATENT DOCUMENTS

| | | | | |
|---|---|---|---|---|
| 3,540,245 | A | * | 11/1970 | Pope ..................... F16B 41/005 |
| | | | | 70/231 |
| 4,742,702 | A | * | 5/1988 | Swertz ................ F16B 23/0069 |
| | | | | 411/910 |
| 4,870,842 | A | | 10/1989 | Plummer |

| | | | |
|---|---|---|---|
| 4,884,422 | A | 12/1989 | Wolter |
| 5,097,686 | A | 3/1992 | Plummer |
| 5,402,662 | A | 4/1995 | Osada |
| 6,719,511 | B2 | 4/2004 | Notaro et al. |
| 7,076,977 | B2 | 7/2006 | Lee |
| 7,392,674 | B1 | 7/2008 | Grote |
| 8,525,653 | B1 | 9/2013 | Bing et al. |
| 8,820,126 | B2 * | 9/2014 | Lin ........................ B62H 5/001 |
| | | | 70/232 |

(Continued)

FOREIGN PATENT DOCUMENTS

WO        2007053920        5/2006

OTHER PUBLICATIONS

Closed-End Secure Lug Nut Set https://tunerrack.com/products/
closed-end-secure-lug-nut-set-neochrome?variant=41335203004581
&currency=USD&utm_medium=product_sync&utm_source=google
&utm_content=sag_organic&utm_campaign=sag_organic&gclid=
EAlaIQobChMIoK38mrmJ9gIV3W1vBB2g6Q_
NEAQYBiABEgKV2_D_BwE.

(Continued)

*Primary Examiner* — Roberta S Delisle
(74) *Attorney, Agent, or Firm* — Bay State IP, LLC

(57) ABSTRACT

Certain aspects are directed to an anti-theft wheel locking
system with independent locking mechanisms configured to
protect the wheels and rims of an automobile is disclosed.
The anti-theft wheel locking system comprises a fastener
with a hollow chamber located on one end of the fastener
and a plurality of lock pin slots disposed around an exterior
of the fastener; a detachable lock with a plurality of retract-
able lock pins that match the design and dimensions of the
hollow chamber and the lock pin slots respectively; a cap
that screws onto a threaded head of the fastener; a cap key
configured to unlock the cap via the unique key protrusions
located on a bottom of the cap key; and an adapter config-
ured to install and remove the fastener when the detachable
lock is removed.

14 Claims, 12 Drawing Sheets

(56)　　　　　　　References Cited

U.S. PATENT DOCUMENTS

| | | | |
|---|---|---|---|
| 8,943,865 | B1 | 2/2015 | Bullock et al. |
| 10,927,881 | B2 | 2/2021 | Carranco |
| 2006/0228191 | A1 | 10/2006 | Ward |
| 2014/0178147 | A1 | 6/2014 | Lin |
| 2019/0154074 | A1 | 5/2019 | Berrell |

OTHER PUBLICATIONS

The Lugdawg Truck Wheel Lock https://www.raneystruckparts.com/
the-lugdawg-truck-wheellock/?gclid=
Cj0KCQiAjJOQBhCkARIsAEKMtO2090_RQ03VwBBNUke20C
Q4H5BpFITJAOiGulOCaNZ1f29xyepOpswaAjOvEALw_wcB.

\* cited by examiner

Fig. 4A                    Fig. 4B

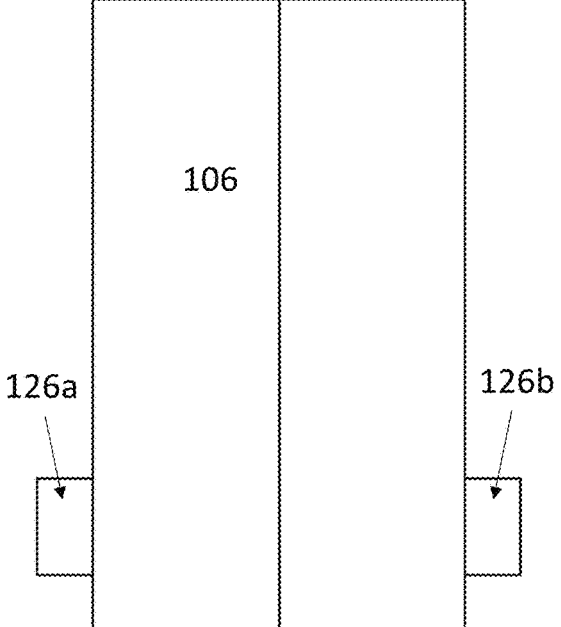
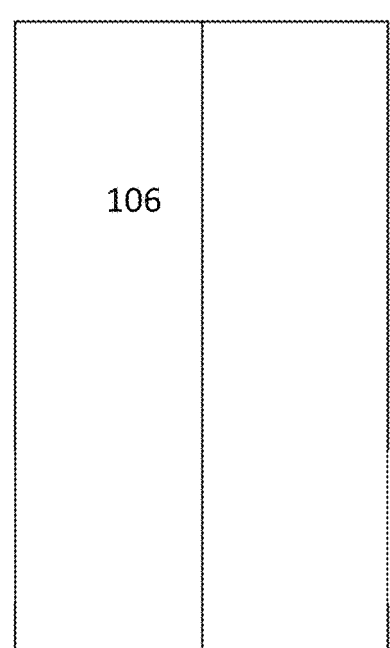
Fig. 7                                    Fig. 8

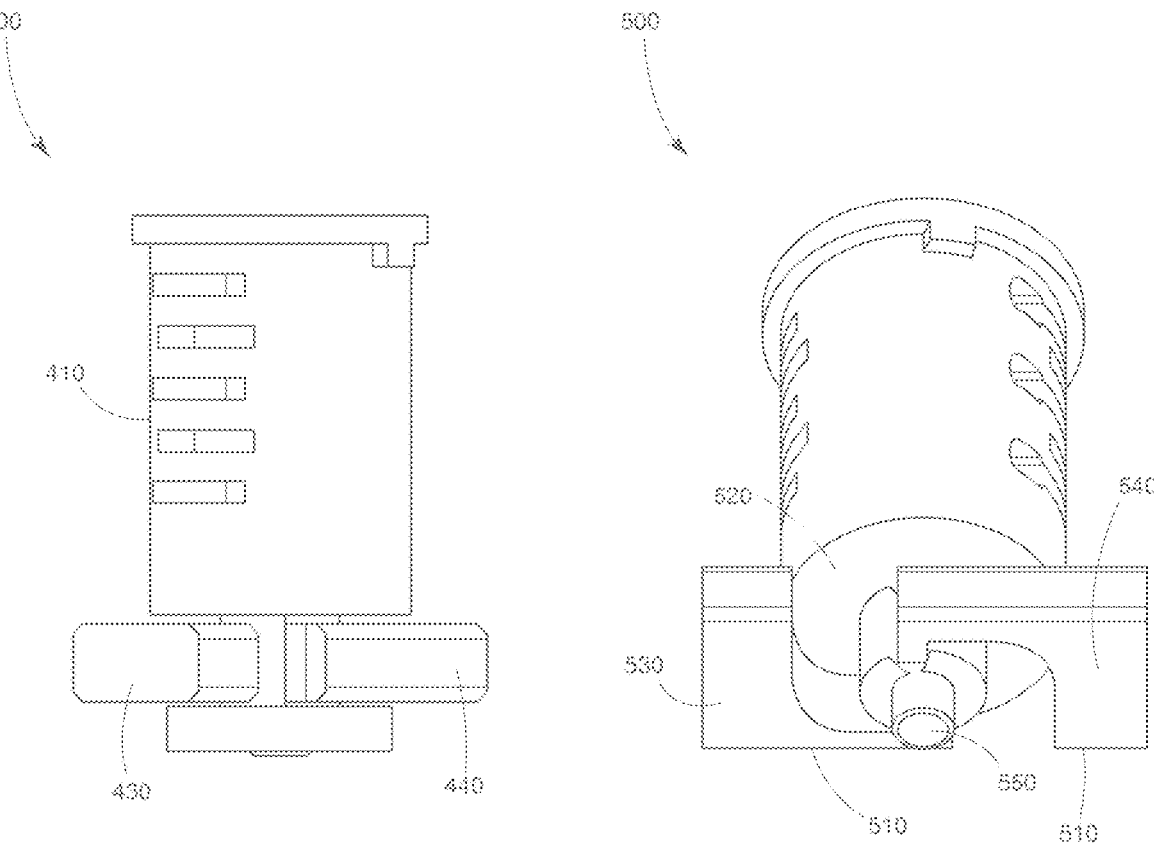
Fig. 12A                    Fig. 12B

120
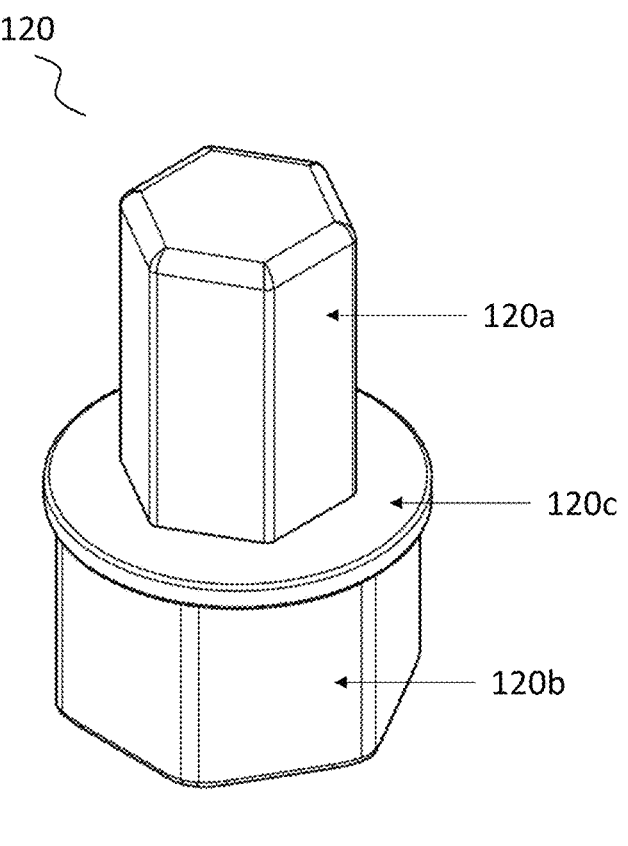
120a
120c
120b
Fig. 13A
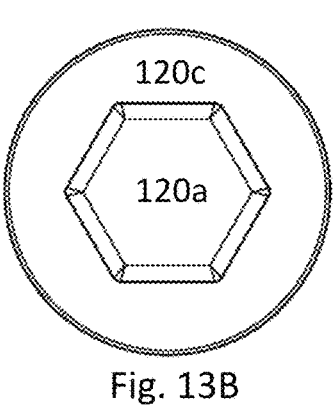
120c
120a
Fig. 13B
120a
120c
120b
Fig. 13C

LOCKING SYSTEM

CROSS REFERENCE TO RELATED APPLICATION

This application is a continuation application and takes priority from and claims the benefit of U.S. patent application Ser. No. 18/228,035 filed on Jul. 31, 2023 and which in turn takes priority from and claims the benefit of Provisional Application Serial No. 63/411,985 filed on Sep. 30, 2022, the contents of which are incorporated by reference.

BACKGROUND OF THE INVENTION

Field of the Invention

This disclosure relates generally to an anti-theft locking mechanism, and more particularly, the present disclosure relates to a locking system comprising a plurality of locking mechanisms designed to protect automobile wheels from theft.

Description of the Related Art

Automobile wheel theft is a common problem worldwide as the wheels are easy to steal and highly valuable. Millions of dollars' worth of wheels are stolen and sold every year. Despite the technological advancements made in the automobile industry, a prevalent problem remains as outdated lug nut and bolt designs allow wheels to be removed within a matter of minutes by using a high-torque impact wrench, causing financial burdens to vehicle owners.

In order to protect against these types of incidents, many vehicle owners have resorted to solutions such as wheel locks, car alarm with sensors, or metal boots to lock up the wheels which cover the lug nuts and bolts.

One of the most common solutions is wheel locks, however the current "wheel locks" do not actually possess any type of locking mechanisms or a lock. Moreover, some prior art devices including wheel locks are configured as redesigned lug nuts for wheels that contain theft-deterring sockets, which can only be removed with a wheel lock key that matches the pattern embedded on the wheel lock. However, many wheel locks available on the market do not possess a true unique pattern and car thieves may have access to replacement keys as many of them are available for purchase through the manufacturers. In addition, wheel locks can be removed even without keys via special sockets that dig into the metal to grip the outside of the wheel lock to twist it off. Moreover, some wheel locks can damage the wheel studs if they are not properly installed.

Some prior art car alarms have built-in sensors that can detect any tilt or angle change if car thieves try to jack up the vehicle. However, these car alarms are expensive and difficult to install. Additionally, they are less effective as they are not specifically designed to detect wheel theft.

Some prior art anti-theft wheel protection systems include a plurality of metal boots which cover the entire wheels like earmuffs. However, special tools are normally required to attach them to the wheels. Further, these metal boots are not practical for regular drivers and are cumbersome to install and remove which may incur substantial damages to the wheels easily.

SUMMARY OF THE INVENTION

The instant device and accompanying method of use, as illustrated herein, is clearly not anticipated, rendered obvious, or even present in any of the prior art mechanisms, either alone or in any combination thereof. Thus, the several embodiments of the instant device and method are illustrated herein.

A primary object of the present disclosure is a new anti-theft locking system comprising at least two locking mechanisms preferably as a deterrent against wheel theft, namely, a fastener with locking mechanism inside a housing, and a detachable and protective cap.

In a first aspect, the locking mechanism may be considered a fastener that is inserted into the end of a nut and/or bolt thereby inhibiting the use of a torque generating tool to apply force to the nut and/or bolt to prevent removal.

In one aspect, provided is a new anti-theft locking system that is easy to operate, wherein the locking system comprises a plurality of locking mechanisms that can be unlocked via a number of unique keys designed to deter thieves.

Accordingly, certain aspects are directed to an anti-theft locking system with an independent locking mechanism configured to preferably protect the wheels and rims of an automobile is disclosed. The anti-theft locking system comprises a tubular fastener with a hollow chamber located on a threaded head of the fastener and a plurality of lock pin slots disposed around an exterior of the fastener, or similar device; a detachable lock with a plurality of retractable lock pins that match the design and dimensions of the hollow chamber and the lock pin slots respectively; a cap that screws onto the threaded head of the fastener; a cap key configured to unscrew the cap via a plurality of unique key protrusions located on a bottom of the cap key; and an adapter configured to facilitate the installation and removal of the fastener when the detachable lock is removed.

In one embodiment, the anti-theft locking system comprises a locking mechanism. The locking mechanism comprises a fastener with a head and a seat, a chamber, and a plurality of pin slots configured to accommodate a detachable lock which is designed to prevent unauthorized access to the chamber.

In one embodiment, the anti-theft locking system comprises two independent locking mechanisms. The first locking mechanism comprises a fastener with a head and a seat, a chamber, and a plurality of pin slots configured to accommodate a detachable lock which is designed to prevent unauthorized access to the chamber. The secondary locking mechanism comprises a cap with a plurality of key holes exposed on a top surface and a cap key with a plurality of key protrusions configured to protect the internal components of the detachable lock.

In one embodiment, the anti-theft locking system comprises two independent locking mechanisms. The first locking mechanism comprises a fastener with a head and a seat, a chamber, and a plurality of pin slots configured to accommodate a detachable lock which is designed to prevent unauthorized access to the chamber. The secondary locking mechanism comprises a cap with a plurality of key holes exposed on a top surface and a cap key with a plurality of key protrusions configured to protect the internal components of the detachable lock. Separately, an adapter which works in conjunction with the anti-theft locking system comprises an adapter which includes a top portion, a bottom portion, and a flange that protrudes in between the top and bottom portions. In one embodiment, the top portion fits in the chamber and the length of the chamber equals a length of the bottom portion of the adapter, wherein the flange rests on top of the threaded head such that a vehicle owner may use the adapter to install and remove the fastener.

In one embodiment, the fastener is a detachable lug nut or lug bolt configured to prevent wheel theft.

In one embodiment, the chamber is disposed near the head with male threads, wherein a plurality of pin slots is located near the bottom of the chamber.

In one embodiment, the fastener comprises an upper portion and a lower portion, wherein the upper portion houses a chamber, and the lower portion houses an internal threaded aperture.

In one embodiment, the detachable lock is tubular and comprises an upper portion with an embedded lock cylinder and a lower portion with a mechanism that controls the lateral movement of the pins. The lock cylinder is preferably cylindrical.

Additionally, in one embodiment, the detachable lock further comprises at least two retractable pins, wherein the pins are located on the flat sides of the detachable lock at the bottom of the detachable lock opposite the end that the key is inserted, such that when the lock cylinder is turned, the pins may slide in and out of the pin slots in order to lock and unlock the detachable lock.

In one embodiment, the pins are controlled by a swivel mechanism located in a base of the detachable lock, wherein the base further comprises a pair of channels that are symmetrical around a center point of the base. A center post of each pin may slide away from the center point in the channels synchronously as the pins slide into the pin slots on the fastener. Conversely, the center posts of the pins slide in the channels towards the center point of the base as the pins slide out of the pin slots.

In yet another embodiment, the pins are controlled by a rotatable mechanism located in a base of the detachable lock, which comprises a pair of pins, preferably L-shaped, that simultaneously move laterally and outwardly away from the center point of the base to secure the detachable lock in place.

In one embodiment, the chamber and the threaded aperture do not make contact with each other as they are separated by a longitudinal gap situated between the chamber and the threaded aperture to protect the structural integrity of the fastener.

In one embodiment, when the pins are retracted, they are completely flush with respect to the exterior of the detachable lock. Moreover, when the detachable lock is received by the chamber, the upper portion of the detachable lock is flush with respect to a top surface of the threaded head as a length of the detachable lock equals that of the chamber.

In some embodiments, the anti-theft locking system further comprises an adapter, which includes a top portion, a bottom portion, and a flange that protrudes in between the top and bottom portions. In one embodiment, the top portion fits in a socket or similar device, and the bottom fits in the chamber and the length of the chamber equals a length of the bottom portion of the adapter, wherein the flange rests on top of the threaded head such that a vehicle owner may use the adapter to install and remove the fastener.

There has thus been outlined, rather broadly, the more important features of the locking system, in order that the detailed description thereof that follows may be better understood, and in order that the present contribution to the art may be better appreciated. There are additional features of the system that will be described hereinafter, and which will form the subject matter of the claims appended hereto. In this respect, before explaining at least one embodiment of the system in detail, it is to be understood that the system and the accompanying method are not limited in its application to the details of construction and to the arrangements of the components set forth in the following description, and/or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the instrument and method of use, are pointed out with particularity in the claims annexed to and forming a part of this disclosure. For a better understanding of the instrument, its operating advantages and the specific objects attained by its uses, reference should be made to the accompanying drawings and descriptive matter in which there are illustrated preferred embodiments of the system.

The foregoing has outlined the more pertinent and important features of the instrument and method of use in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

FIG. 7 illustrates a schematic diagram showing a front view of the locking mechanism at its locked position with the pins extended.

FIG. 8 illustrates a schematic diagram showing a front view of the locking mechanism at its unlocked position with the pins retracted.

FIG. 12A illustrates a schematic diagram of an alternative embodiment showing a side view of another locking mechanism at its locked position with the pins extended.

FIG. 12B illustrates a schematic diagram showing a bottom perspective view of another locking mechanism at its locked position with the pins extended.

FIG. 13A illustrates a schematic diagram showing a perspective view of the adapter.

FIG. 13B illustrates a schematic diagram showing a top view of the adapter.

FIG. 13C illustrates a schematic diagram showing a side view of the adapter.

DETAILED DESCRIPTION OF THE SEVERAL EMBODIMENTS

Reference will now be made to non-limiting embodiments, examples of which are illustrated in the Figures.

Figure 1:
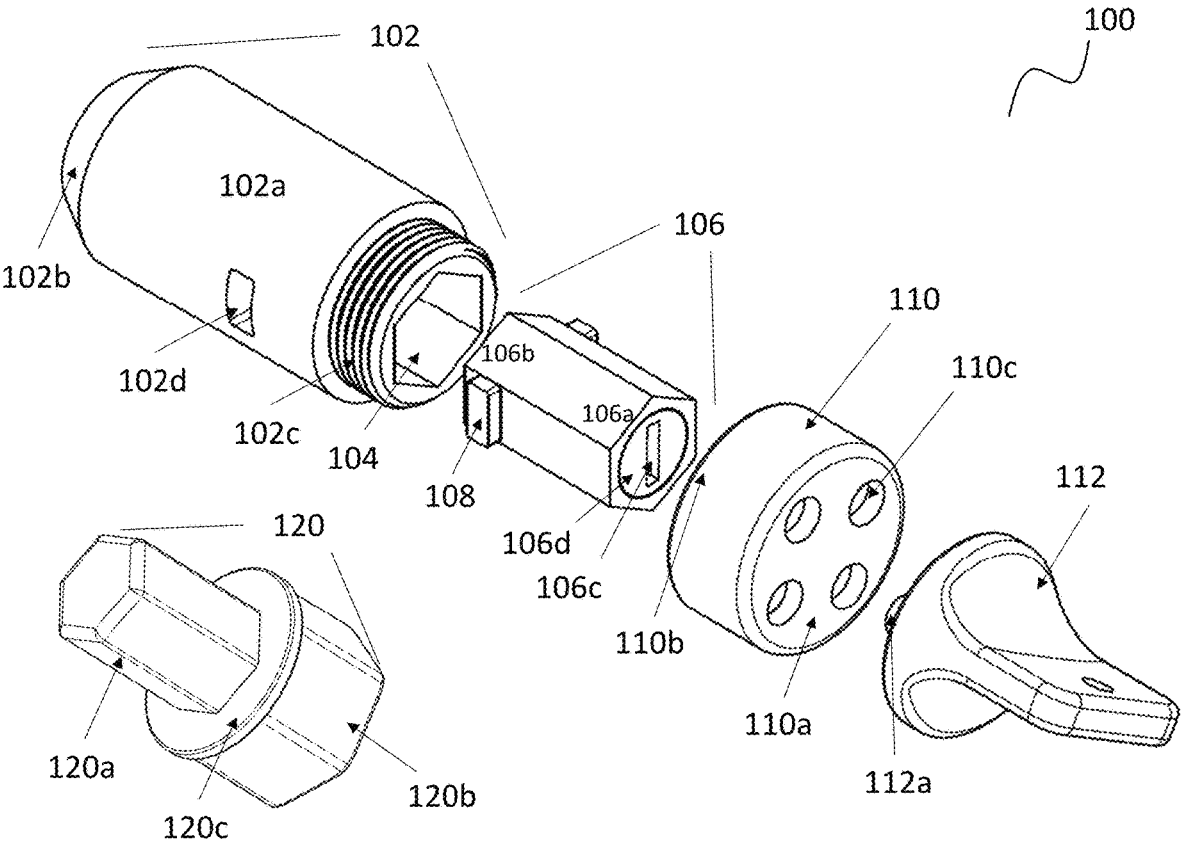
FIG. 1 illustrates a schematic diagram showing an exploded view of the locking system.

FIG. 1 illustrates an exploded view of an anti-theft wheel locking system 100, wherein the wheel locking system 100 preferably comprises a fastener 102 with an internal chamber 104 such that fastener 102 and chamber 104 in combination are configured to receive a detachable lock 106, a cap 110, a cap key 112 and an adapter 120, respectively. In a preferred embodiment, the fastener 102 further comprises an elongated sleeve 102a, a seat 102b located at one end of the fastener 102, a head 102c with male threads located at the other end of the fastener 102, and a plurality of pin slots 102d located on a peripheral of the sleeve 102a. In this embodiment, the detachable lock 106 is locked in place, within the chamber 104 of the fastener 102; preferably the chamber is hexagonal in shape, however other shapes may be contemplated depending on the automobile and user preference. The seat 102b is tapered and preferably conical, spherical, or any other similarly conceived design such that the fastener 102 is secured on to the wheel studs (not shown) of an automobile. The opening of the chamber 104 is located near the threaded head 102c of the fastener 102 in order to receive the detachable lock 106. In some embodiments, the overall shapes of both the chamber 104 and the detachable lock 106 are nearly identical, and they may be selected from a variety of different geometric designs to prevent any unauthorized attempt to rotate and/or remove the detachable lock 106 from the chamber 104 of the wheel locking system 100.

Additionally, the detachable lock 106 is preferably elongated and comprises a top 106a and a base 106b, wherein the top 106a further comprises a key slot 106c designed to lock the fastener 102 by controlling a plurality of retractable pins 108 located near the base 106b. A vehicle owner may lock the plurality of retractable pins 108 through the pin slots 102d by rotating the key slot 106c via a key (not shown) to prevent any access to the chamber 104 of the fastener 102.

The cap 110 is provided with a top side 110a and a bottom side 110b, wherein the top side 110a further comprises a plurality of holes 110c; and wherein the bottom side 110b comprises female threads 110d such that the cap 110 can be screwed on to the head 102c using the cap key 112. The cap 110 is configured to protect the internal components of the detachable lock 106.

In a preferred embodiment, the adapter 120 comprises a top portion 120a, a bottom portion 120b, and a flange 120c that protrudes in between the top and bottom portions 120a, 120b.

Figure 2:
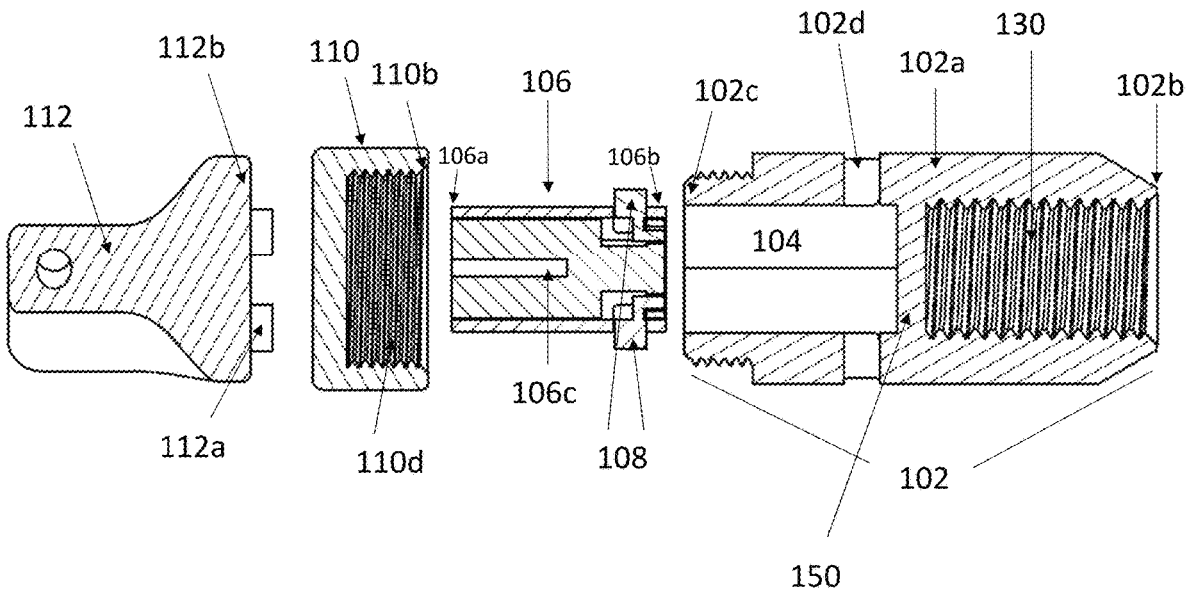
FIG. 2 illustrates a schematic diagram showing an exploded sectional view of the locking system.

FIG. 2 illustrates a sectional view of the anti-theft wheel locking system 100. In a preferred embodiment, the cap key 112 comprises a plurality of geometric protrusions 112a located on a bottom 112b of the cap key 112 which allows a vehicle owner to unscrew the cap 110 by aligning the protrusions 112a with the plurality of holes 110c on the top side 110a of the cap 110 in order to gain access to the key slot 106c.

In one embodiment, the key slot 106c rotates clockwise to extend the plurality of pins 108 into pin slots 102d and counter-clockwise to retract the plurality of pins 108 from pin slots 102d; the key slot 106c may rotate either clockwise or counter-clockwise depending on the preferred design of the user and specific use of the locking system.

In order to assemble the anti-theft locking system 100 together, the fastener 102 comprises a head 102c with male thread and a lug seat 102b, wherein the chamber 104 is located in the sleeve 102a near the head 102c and a threaded aperture 130 is located in the sleeve 102a near the seat 102b. The chamber 104 and the threaded aperture 130 are coaxially and longitudinally positioned at the center of the fastener 102. However, the chamber 104 and the threaded aperture 130 do not make contact and they are separated by a longitudinal gap 150 between the chamber 104 and the threaded aperture 130 to protect the structural integrity of the fastener 102.

In some embodiments, the plurality of pin slots 102d and the chamber 104 overlap such that when the detachable lock 106 is inserted into the chamber 104, the plurality of pins 108 are locked inside the plurality of pin slots 102d when the pins 108 are extended.

Figure 3:
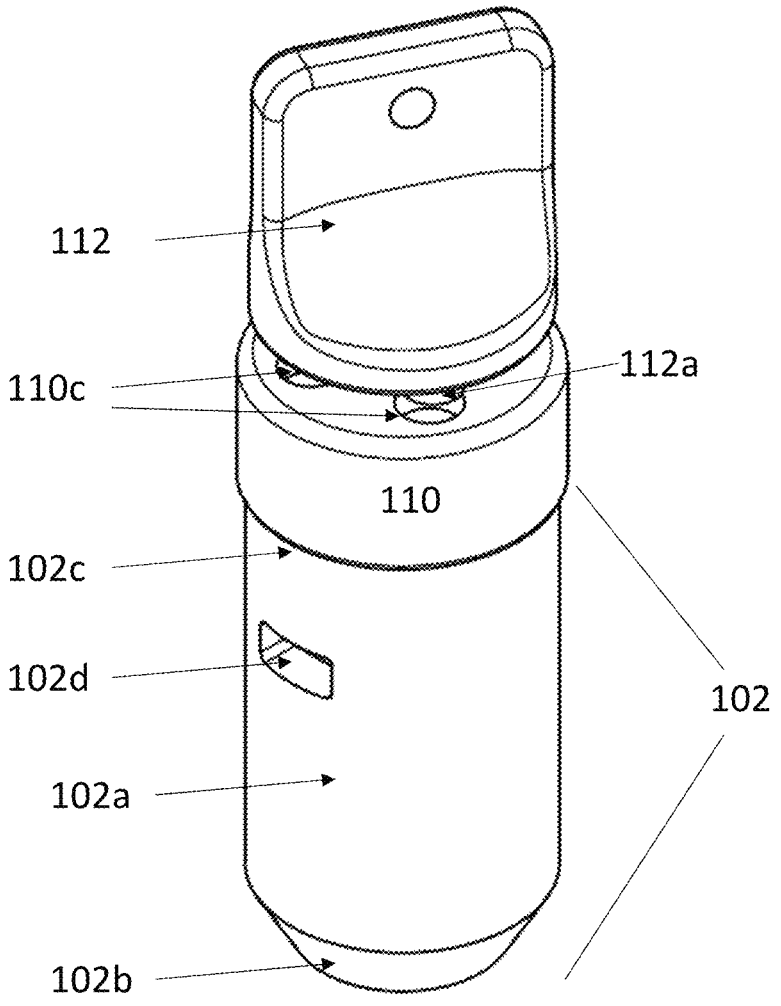
FIG. 3 illustrates a schematic diagram showing a top perspective view of the assembled locking system.

FIG. 3 illustrates a perspective view of the assembled anti-theft locking system 100. In one embodiment, the plurality of pin slots 102d are rectangular cutouts configured to receive the plurality of pins 108. In some embodiments, the pins 108 are generally tubularly shaped to maintain the rigidity of the detachable lock 106.

Figure 4:
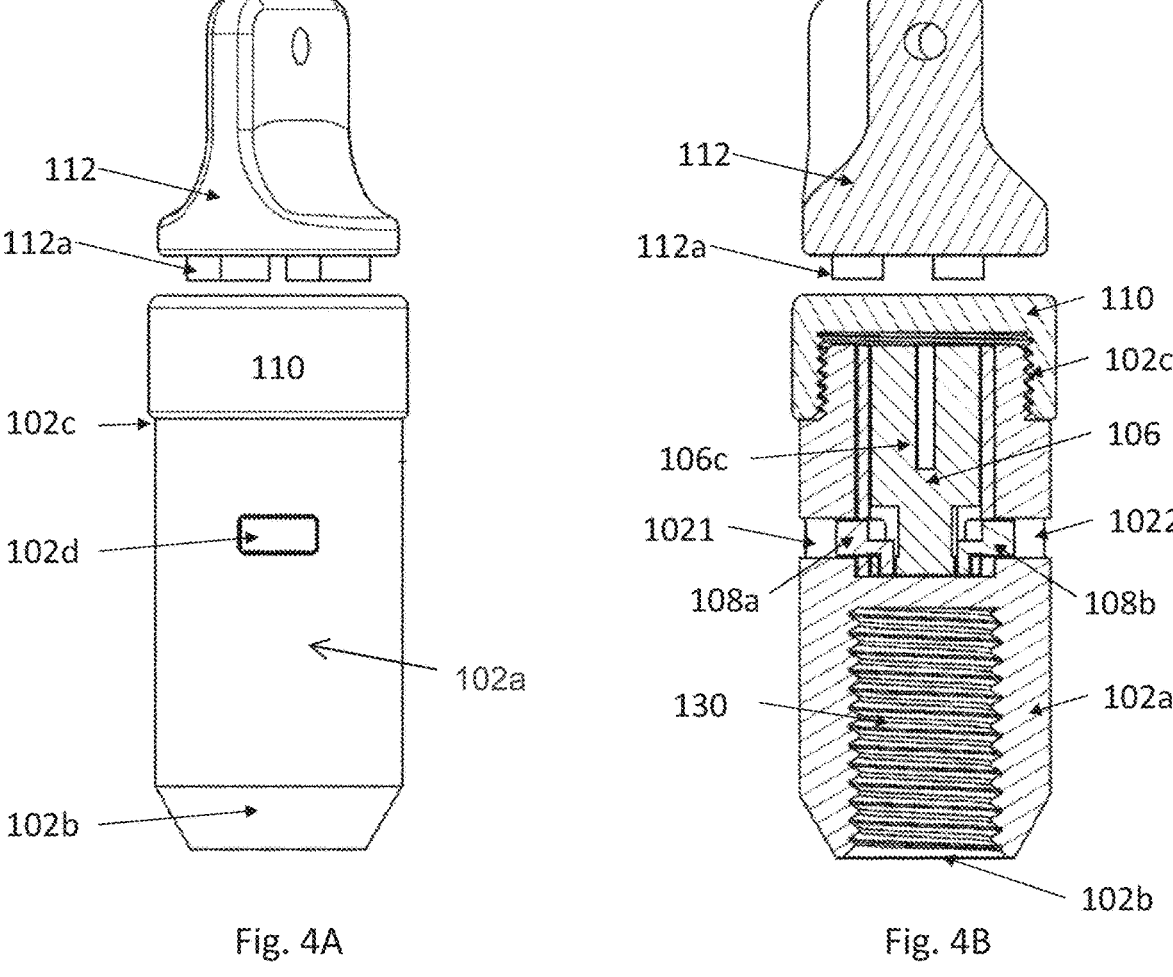
FIG. 4A illustrates a schematic diagram showing a side view of the assembled locking system.
FIG. 4B illustrates a schematic diagram showing sectional view of the assembled locking system.

FIGS. 4A-4B illustrate side views of the fully assembled anti-theft system 100. In a preferred embodiment as depicted in FIG. 4B, to assemble the anti-theft locking system 100, initially a user of the locking system 100 places the fastener 102 onto a vehicle wheel and uses the adapter 120 to tighten and then to lock the detachable lock 106 in the chamber 104 inserts using a key in the key slot 106c. The detachable lock 106 is secured when a pair of pins 108a, 108b are fully extended into the pin slots 1021, 1022 respectively. The vehicle owner can then screw the cap 110 onto the threaded head 102c via the cap key 112.

Figure 5:
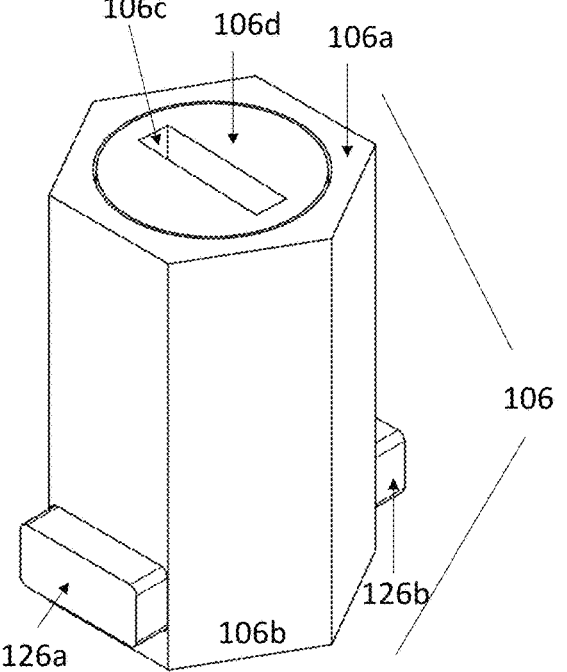
FIG. 5 illustrates a schematic diagram showing a perspective view of the locking mechanism at its locked position with the pins extended.

FIG. 5 illustrates a perspective view of a preferred embodiment of the detachable lock 106 in its locked position, wherein a pair of pins 126a and 126b are located diagonally near the base 106b. When the detachable lock 106 is at its locked position, the pins 126a and 126b are fully extended as depicted in FIGS. 7 and 10.

Figure 6:
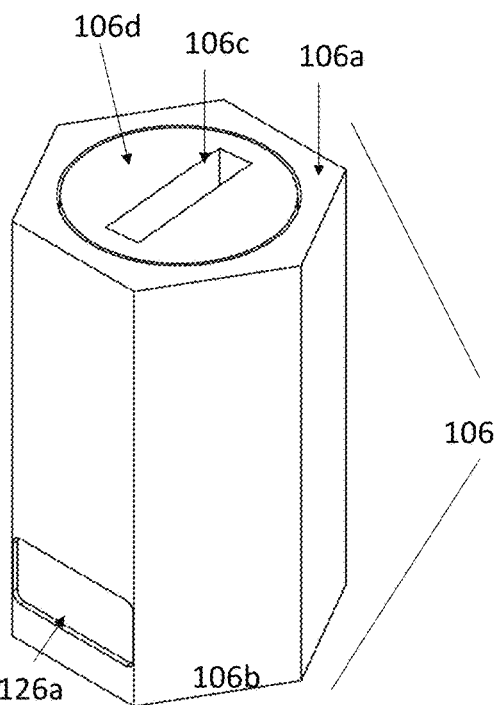
FIG. 6 illustrates a schematic diagram showing another perspective view of the locking mechanism at its unlocked position with the pins retracted.

FIG. 6 illustrates a perspective view of a preferred embodiment of the detachable lock 106 in its unlocked position. The pins 126a and 126b are fully retracted into the detachable lock 106 as depicted in FIGS. 8-9.

Figures 9, 10:
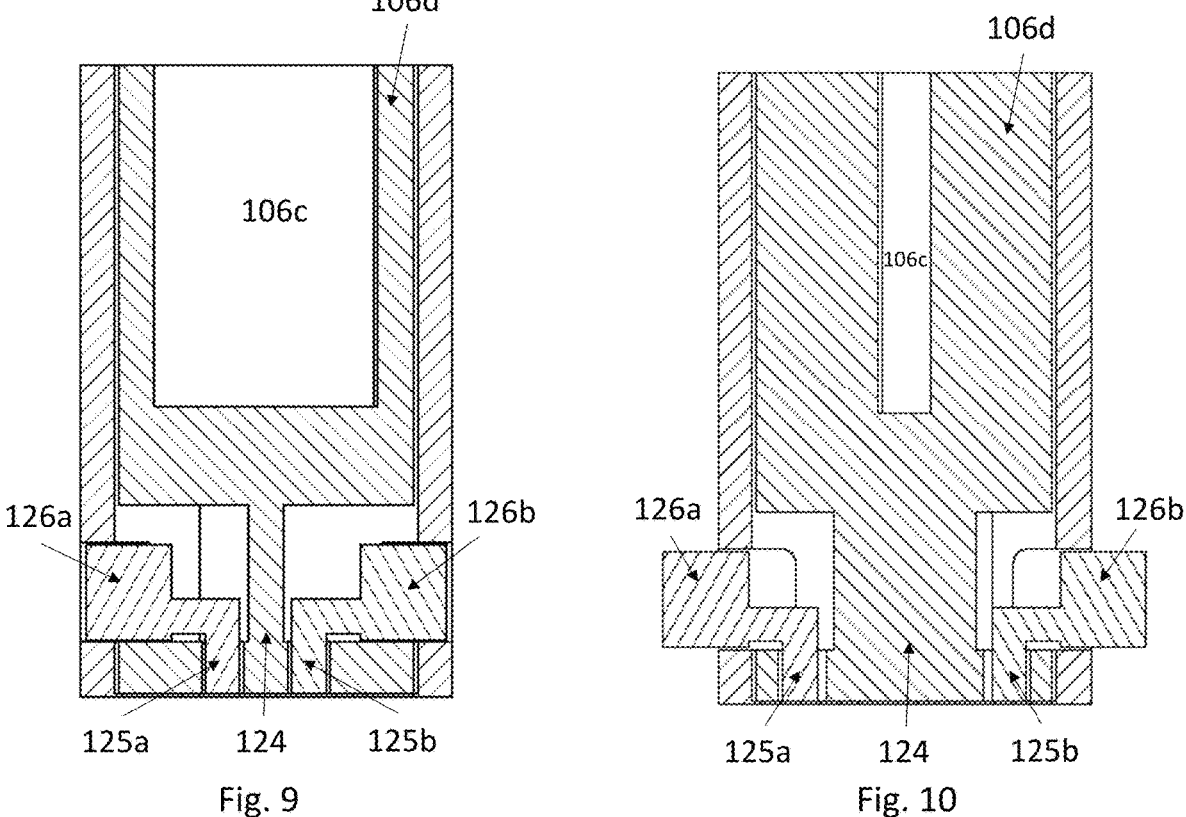
FIG. 9 illustrates a schematic diagram showing a sectional view of the locking mechanism at its unlocked position with the pins retracted.
FIG. 10 illustrates a schematic diagram showing a sectional view of the locking mechanism at its locked position with the pins extended.

In a preferred embodiment as illustrated in FIGS. 9 and 10, pins 126a, 126b slide in and out of the pin slots 125a, 125b respectively when the key slot 106c is turned, which rotates a base 124 of the lock cylinder 106d synchronously.

Figure 11A:
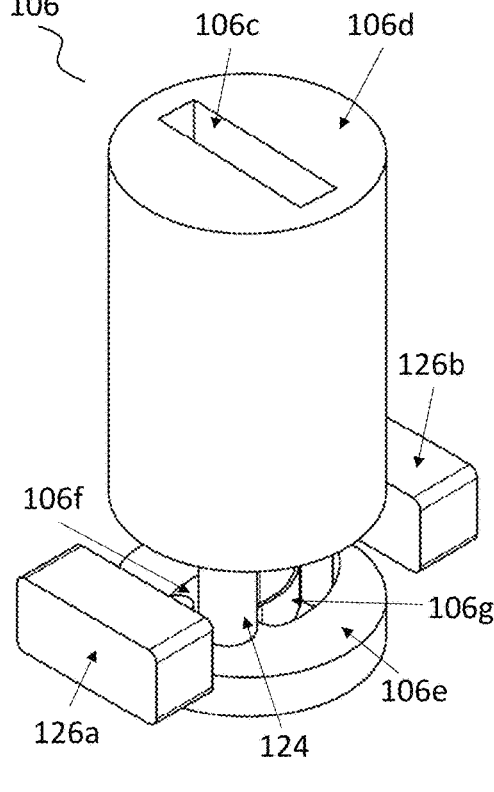
FIG. 11A illustrates a schematic diagram showing a perspective view of the locking mechanism without the housing.

In some embodiment, the detachable lock 106 further comprises a lock cylinder 106d that is rotatable when a key is inserted in the key slot 106c. In FIG. 11A, when the lock cylinder 106d is turned, the pins 126a, 126b are extended from the lock cylinder 106d via channels 106f, 106g located in a lock cylinder base 106e as the base 124 rotates.

Figure 11B:
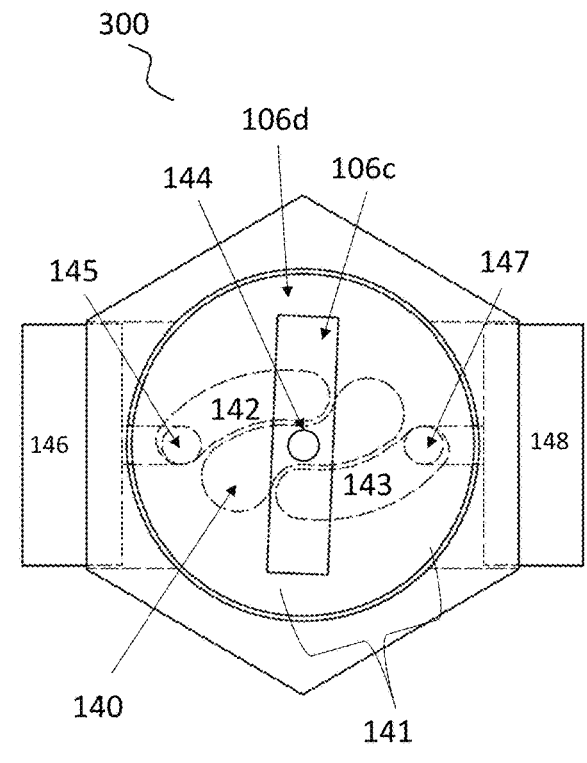
FIG. 11B illustrates a schematic diagram showing a top view of the locking mechanism with the pins extended, as enabled by the swivel mechanism at the bottom of the locking mechanism.

In one embodiment as illustrated in FIG. 11B, a detachable lock cylinder 300 is enabled by a swivel mechanism 140 at a base 141 of the lock cylinder 106d. The base 141 comprises a first channel 142 and a second channel 143, wherein the first channel 142 and the second channel 143 are symmetrical around a center point 144 of the base 141. A first center post 145 of pin 146 travels away from the center point 144 in the first channel 142 while a second center post 147 of pin 148 travels away from the center point 144 in the second channel 143 simultaneously as pins 146 and 148 extend outwardly from the detachable lock 300.

In one embodiment as illustrated in FIG. 12A, a detachable lock cylinder 400 comprises a plurality of cut-outs 410 located on an exterior of the cylinder 400. The plurality of cut-outs 410 enable the pins to expand/contract to allow for lock functionality.

In another embodiment as illustrated in FIG. 12B, a lock cylinder 500 is enabled by a rotating mechanism 510 at a bottom 520 of the lock cylinder 500. The rotating mechanism 510 comprises a first pin, preferably L-shaped 530 and a second pin, preferably L-shaped 540 that simultaneously move laterally and outwardly away from a center 550 located at the bottom 520.

Figure 12C:
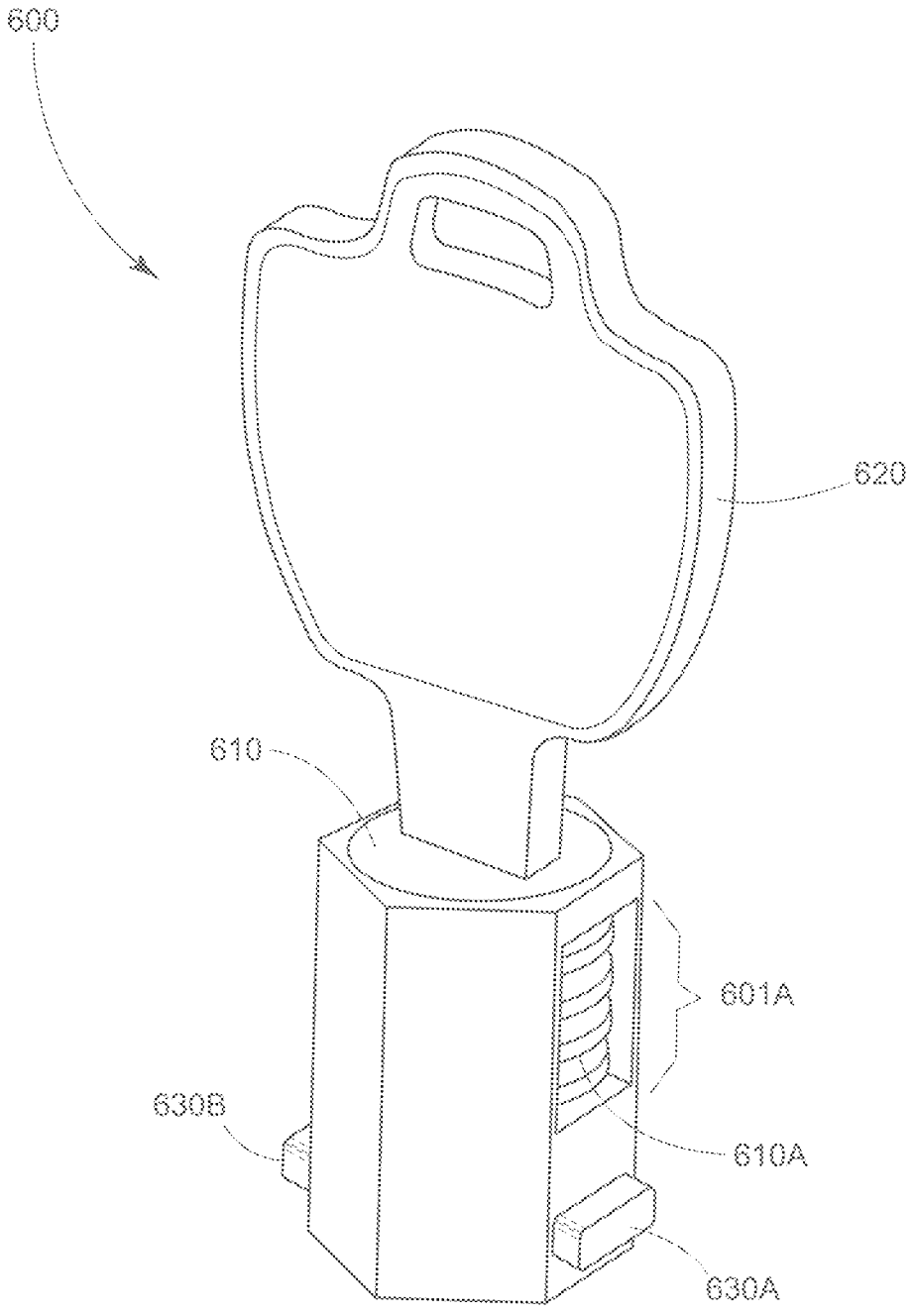
FIG. 12C illustrates a schematic diagram showing a perspective view of a key used to lock and unlock the locking mechanism, shown at its locked position with the pins extended.

In some embodiments, as illustrated in FIG. 12C, a detachable lock 600 comprises a lock cylinder 610 that employs a plurality of security pins that utilizes a spring-loaded mechanism 610a that moves when a key 620 is placed inside the lock cylinder 610. The lock cylinder 610 is in its locked position when pins 630a, 630b are extended outwardly from the detachable lock 600. A window 601a is shown which is to enable the mechanism for manufacturing purposes to prevent the lock from being too compact.

FIGS. 13A-13C illustrate the adapter 120 configured to safely install and remove the fastener 102. The adapter 120 comprises a top portion 120a, a bottom portion 120b, and a flange 120c that protrudes in between the top and bottom portions 120a, 120b. In one embodiment, the top portion 120a is configured to fit in the chamber 104 inside the fastener 102.

Figure 14:
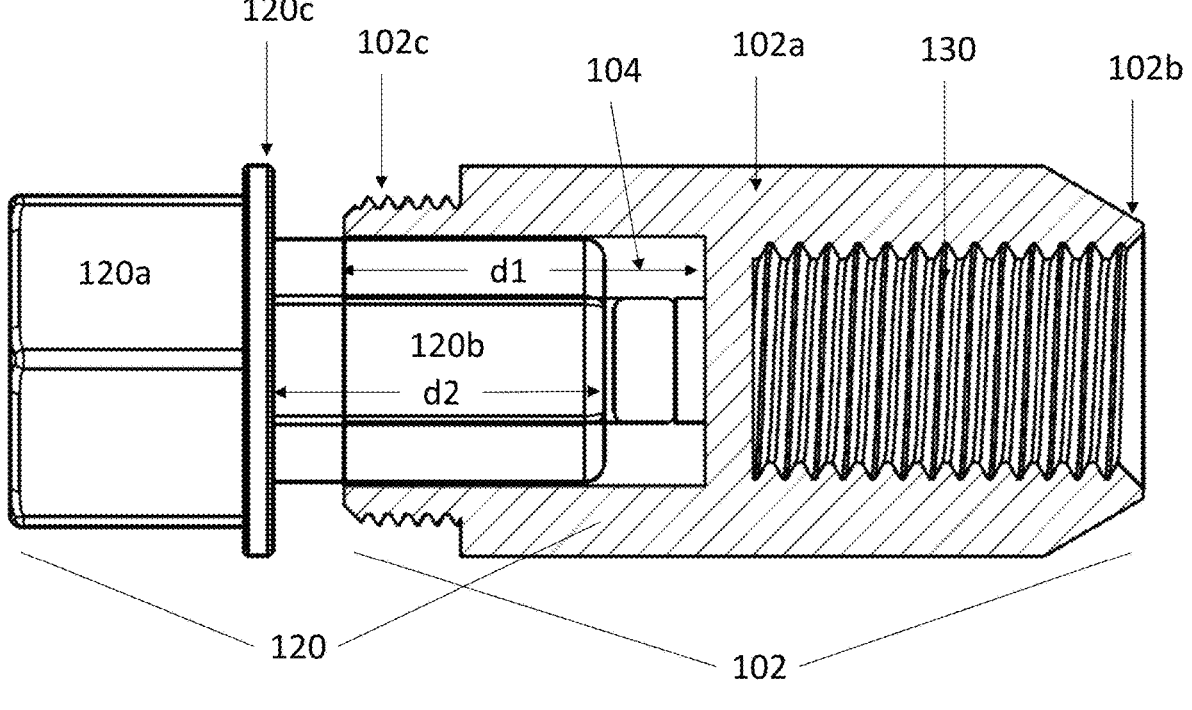
FIG. 14 illustrates a schematic diagram showing a sectional view of the adapter inserted in the wheel locking mechanism.

FIG. 14 illustrates a side view of the adapter 120 inserted in the fastener 102, wherein the bottom portion 120b is received by the chamber 104. In a preferred embodiment, a length d1 of the chamber 104 equals a length d2 of the bottom portion 120b, wherein the flange 120c rests on top of the threaded head 102c which allows a vehicle owner to install and remove the fastener 102 via the adapter 120.

As shown herein, an anti-theft locking system with two independent locking mechanisms is disclosed. In a preferred embodiment, the first locking mechanism comprises a fastener with a threaded head and a chamber and a plurality of pin slots configured to accommodate a detachable lock which is designed to prevent unauthorized access to the chamber. Additionally, the second locking mechanism comprises a cap with a plurality of key holes exposed on a top surface and a unique cap key with a plurality of key protrusions configured to protect the internal components of the detachable lock.

What is claimed is:

1. A locking system comprising:
a fastener, wherein the fastener further comprises:
a sleeve extending along a length of the fastener;

a head located on the fastener;
a portion having a chamber; and
at least one pin slot located on a portion of the fastener and extending from the chamber to the sleeve;
a lock, wherein the lock is configured to be received in the chamber of the fastener and further comprises:
a top, wherein the top includes a key slot; and
at least one retractable pin located on the lock.

2. The locking system of claim 1, wherein the locking system further comprises:
a secondary locking mechanism, wherein the secondary locking mechanism comprises:
a cap with a plurality of holes or protrusions; and
a cap key with protrusions holes which correspondingly fit the plurality of holes or protrusions, respectively, on the cap.

3. The locking system of claim 1, wherein the plurality of pins is controlled by a rotatable mechanism located at a base of the lock, the base comprising:
a plurality of pins that synchronously move laterally and outwardly; and
a plurality of channels around the center point of the base where each pin synchronously slides outward toward the cylindrical sleeve from the internal chamber in to the plurality of pin slots, and synchronously towards a center point of the base as the pins slide out of the pin slots.

4. The locking system of claim 1, wherein the locking system further comprises an adapter, the adapter comprising:
a top portion which fits inside an external device extending from the threaded head;
a bottom portion; and
a flange which protrudes in between the top and bottom portions;
wherein the adapter is configured to install and remove the fastener.

5. The locking system of claim 1, wherein the fastener further comprises a threaded aperture located in the sleeve extending from near the fastener to the internal chamber.

6. A method to prevent theft utilizing the locking system of claim 1, comprising the steps of:
threading the fastener;
using the adapter to tighten the fastener;
inserting the detachable lock into the internal chamber;
matching a corresponding key into the key slot of the detachable lock;
rotating the key in the key slot;
extending the retractable pins from the base into the internal portion of the cylindrical sleeve;
attaching the cap on to the threaded head; and
matching the geometric protrusions or holes of the cap key to the cap and rotating to tighten the cap.

7. The method to prevent theft of claim 6, unlocking the locking system comprises the steps of:
matching the protrusions or holes of the cap key to the cap;
rotating the cap key;
removing the cap using the cap key;
exposing the top portion of the key slot;
inserting the corresponding key into the key slot;
rotating the key in the key slot;
retracting the retractable pins into the base;
removing the detachable lock from the internal chamber; and
removing the fastener.

8. A locking system comprising:
a fastener, wherein the fastener further comprises:

a sleeve;

a head located on the fastener;

a portion having a chamber; and at least one pin slot located on a portion of the fastener;

wherein the fastener is inserted onto the end of a nut or bolt thereby inhibiting the use of a torque generating tool to apply force to the nut or bolt to prevent removal; and a lock, wherein the detachable lock is configured to be received in the chamber of the fastener and further comprises:

a plurality of retractable pins located on the lock.

9. The locking system of claim 8, wherein the locking system further comprises:

a secondary locking mechanism, wherein the secondary locking mechanism comprises:

a cap with a plurality of holes or protrusions; and a cap key with protrusions or holes which correspondingly fit the plurality of holes or protrusions, respectively, on the cap.

10. The locking system of claim 8, wherein the plurality of pins is controlled by a rotatable mechanism located at a base of the lock, the base comprising:

a plurality of pins that synchronously move laterally and outwardly; and a plurality of channels around the center point of the base where each pin synchronously slides outward toward the cylindrical sleeve from the internal chamber in to the plurality of pin slots, and synchronously towards a center point of the base as the pins slide out of the pin slots.

11. The locking system of claim 8, wherein the locking system further comprises an adapter, the adapter comprising:

a top portion which fits inside an external device extending from the threaded head;

a bottom portion; and a flange which protrudes in between the top and bottom portions;

wherein the adapter is configured to install and remove the fastener.

12. The locking system of claim 8, wherein the fastener further comprises a threaded aperture located in the sleeve extending from near the fastener to the internal chamber.

13. A method to prevent theft utilizing the locking system of claim 8, comprising the steps of:

threading the fastener;

using the adapter to tighten the fastener;

inserting the detachable lock into the internal chamber;

matching a corresponding key into the key slot of the detachable lock;

rotating the key in the key slot;

extending the retractable pins from the base into the internal portion of the cylindrical sleeve;

attaching the cap on to the threaded head; and matching the geometric protrusions or holes of the cap key to the cap and rotating to tighten the cap.

14. The method to prevent theft of claim 8, unlocking the locking system comprises the steps of:

matching the protrusions or holes of the cap key to the cap;

rotating the cap key;

removing the cap using the cap key;

exposing the top portion of the key slot;

inserting the corresponding key into the key slot;

rotating the key in the key slot;

retracting the retractable pins into the base;

removing the detachable lock from the internal chamber; and removing the fastener.

* * * * *